United States Patent
Kato et al.

(10) Patent No.: US 8,292,736 B2
(45) Date of Patent: Oct. 23, 2012

(54) GAME DEVICE, INFORMATION STORAGE MEDIUM, AND GAME DEVICE CONTROL METHOD

(75) Inventors: Kenichiro Kato, Tokyo (JP); Kazuhide Nakazawa, Tokyo (JP); Masato Akiyama, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1568 days.

(21) Appl. No.: 11/663,474

(22) PCT Filed: Jul. 4, 2005

(86) PCT No.: PCT/JP2005/012340
§ 371 (c)(1),
(2), (4) Date: Mar. 22, 2007

(87) PCT Pub. No.: WO2006/033194
PCT Pub. Date: Mar. 30, 2006

(65) Prior Publication Data
US 2008/0248870 A1    Oct. 9, 2008

(30) Foreign Application Priority Data

Sep. 22, 2004 (JP) ................................ 2004-275957

(51) Int. Cl.
*A63F 9/24* (2006.01)
*A63F 13/00* (2006.01)
*G06F 17/00* (2006.01)
*G06F 19/00* (2011.01)

(52) U.S. Cl. ................... 463/36; 463/23; 463/8; 463/30; 463/31; 345/473; 345/427

(58) Field of Classification Search .................. None
See application file for complete search history.

(56) References Cited

U.S. PATENT DOCUMENTS
4,858,930 A * 8/1989 Sato .............................. 463/23
(Continued)

FOREIGN PATENT DOCUMENTS
EP      1161975 A    12/2001
(Continued)

OTHER PUBLICATIONS

Diablo II User Manual, 1997-2000 located at www.replacementdocs.com, (48 pages).*

*Primary Examiner* — Paul A D'Agostino
(74) *Attorney, Agent, or Firm* — Sughrue Mion, PLLC (57) ABSTRACT

A game device allowing a player to enjoy the process of acquiring information on an input procedure of operation data corresponding to a predetermined event is provided. A game device including a controller allowing input of operation data comprises judgment means for judging whether or not an operation data sequence input with the controller matches a predetermined operation data sequence, event triggering means for triggering a predetermined event (special technique or the like) corresponding to the predetermined operation data sequence in accordance with a result of judgment by the judgment means, operation guidance means for displaying on a guidance screen (FIG. 5) operation data identification images (52), (56), (64) each identifying operation data in accordance with the predetermined operation data sequence, restriction means for restricting display of all or part of the operation data identification images (56), (64), and restriction lifting means for partially or completely lifting the restriction in accordance with contents of a play.

11 Claims, 6 Drawing Sheets

U.S. PATENT DOCUMENTS

| | | | |
|---|---|---|---|
| 5,649,861 A | 7/1997 | Okano et al. | |
| 5,680,534 A * | 10/1997 | Yamato et al. | 345/473 |
| 6,319,121 B1 * | 11/2001 | Yamada et al. | 463/8 |
| 6,340,330 B1 * | 1/2002 | Oishi et al. | 463/8 |
| 6,358,148 B1 * | 3/2002 | Tanaka | 463/23 |
| 6,373,488 B1 * | 4/2002 | Gasper et al. | 345/427 |
| 6,421,072 B1 | 7/2002 | Ku et al. | |
| 6,656,051 B2 * | 12/2003 | Ishii et al. | 463/43 |
| 6,729,960 B1 * | 5/2004 | Matsuno | 463/30 |
| 6,758,756 B1 | 7/2004 | Horigami et al. | |
| 6,764,401 B1 * | 7/2004 | Akatsuka | 463/36 |
| 6,807,521 B1 * | 10/2004 | Kurosawa et al. | 703/22 |
| 7,054,831 B2 * | 5/2006 | Koenig | 705/14.5 |
| 7,677,896 B1 * | 3/2010 | Sonwalkar | 434/236 |
| 2001/0016511 A1 * | 8/2001 | Hino et al. | 463/8 |
| 2002/0082077 A1 * | 6/2002 | Johnson et al. | 463/30 |
| 2002/0128061 A1 | 9/2002 | Blanco | |
| 2002/0160824 A1 * | 10/2002 | Goto et al. | 463/9 |
| 2002/0160835 A1 * | 10/2002 | Fujioka et al. | 463/31 |
| 2002/0198046 A1 * | 12/2002 | Nakazawa | 463/31 |
| 2003/0060248 A1 * | 3/2003 | Yamashita | 463/1 |
| 2003/0092492 A1 * | 5/2003 | Ishii et al. | 463/42 |
| 2003/0109297 A1 * | 6/2003 | Fukutome | 463/7 |
| 2003/0148810 A9 * | 8/2003 | Nishizawa et al. | 463/31 |
| 2004/0005921 A1 * | 1/2004 | Shinoda | 463/29 |
| 2004/0053690 A1 * | 3/2004 | Fogel et al. | 463/31 |
| 2004/0075677 A1 * | 4/2004 | Loyall et al. | 345/706 |
| 2005/0054402 A1 * | 3/2005 | Noguchi et al. | 463/5 |
| 2007/0060347 A1 * | 3/2007 | Itou | 463/31 |
| 2007/0087801 A1 * | 4/2007 | Kotani et al. | 463/8 |

FOREIGN PATENT DOCUMENTS

| | | |
|---|---|---|
| JP | 7-112072 A | 5/1995 |
| JP | 2001-46742 A | 2/2001 |
| JP | 3534342 B2 | 6/2004 |
| JP | 2004-290306 A | 10/2004 |
| WO | WO 99/32200 A1 | 7/1999 |

* cited by examiner

| | | | |
|---|---|---|---|
| COMBO CHIPS | A | × | 3 |
| COMBO CHIPS | B | × | 2 |
| COMBO CHIPS | C | × | 0 |
| COMBO CHIPS | D | × | 0 |
| COMBO CHIPS | E | × | 0 |
| COMBO CHIPS | F | × | 0 |

GAME DEVICE, INFORMATION STORAGE MEDIUM, AND GAME DEVICE CONTROL METHOD

TECHNICAL FIELD

The present invention relates to a game device, an information storage medium, and a method of controlling a game machine, and more particularly to a game for triggering a predetermined event by entering operation data in a predetermined order.

BACKGROUND ART

Battle games in which a game character manipulated by a player fights another game character manipulated by a computer or an opponent player have been gaining popularity. In some of these games, players can cause the game character to perform their special technique by operating a cross key, a button, and the like provided on a controller in accordance with a predetermined procedure to input a predetermined operation data sequence to a computer such as a game machine. In such a game, players obtain the operation procedure for triggering performance of a special technique from an instruction manual or an operation guidance screen, and practice so that they can actually make it perform the technique using the controller. See U.S. Pat. No. 6,149,523 for reference.

DISCLOSURE OF THE INVENTION

Problems to be Solved by the Invention

In conventional games, however, all operation procedures for triggering performance of special techniques are described in the instruction manual, or simply displayed on an operation guidance screen, whereby players cannot fully enjoy the process of acquiring the operation procedure for triggering performance of the special techniques.

The present invention has been conceived in view of the above problem, and aims to provide a game device, an information storage medium, and a method of controlling a game machine, capable of allowing players to fully enjoy the process of acquiring information on a predetermined operation data sequence corresponding to a predetermined event.

The present invention has been conceived in view of the above-described problem, and aims to provide a game machine, an information storage medium, a method of controlling a game device that allow a player to enjoy a process of acquiring information on a predetermined operation data sequence corresponding to a predetermined event.

Means for Solving the Problems

In order to solve the above problem, a game device according to one aspect of the present invention is a game device including a controller allowing input of operation data, comprising judgment means for judging whether or not an operation data sequence input with the controller matches a predetermined operation data sequence, event triggering means for triggering a predetermined event corresponding to the predetermined operation data sequence in accordance with a result of judgment by the judgment means, operation guidance means for displaying on a guidance screen operation data identification images each identifying operation data item in accordance with the predetermined operation data sequence, restriction means for restricting display of all or part of the operation data identification images, and restriction lifting means for partially or completely lifting the restriction in accordance with contents of a play.

A program according to another aspect of the present invention is a program executed by a computer connected to a controller allowing input of operation data and causing the computer to function as judgment means for judging whether or not an operation data sequence input with the controller matches a predetermined operation data sequence, event triggering means for triggering a predetermined event corresponding to the predetermined operation data sequence in accordance with a result of judgment by the judgment means, operation guidance means for displaying on a guidance screen operation data identification images each identifying an operation data item in accordance with the predetermined operation data sequence, restriction means for restricting display of all or part of the operation data identification images, and restriction lifting means for partially or completely lifting the restriction in accordance with contents of a play. The computer may be, for example, a home-use game machine, an arcade game machine, a game machine for mobile phones, a personal computer, a server computer, and the like. The program may be stored in a computer-readable information storage medium such as a CD-ROM and a DVD-ROM.

A method of controlling a game machine according to a further aspect of the present invention is a method of controlling a game machine including a controller allowing input of operation data, comprising a judgment step for judging whether or not an operation data sequence input with the controller matches a predetermined operation data sequence, an event triggering step for triggering a predetermined event corresponding to the predetermined operation data sequence in accordance with a result of judgment at the judgment step, an operation guidance step for displaying on a guidance screen operation data identification images each identifying operation data item in accordance with the predetermined operation data sequence, a restriction step for restricting display of all or part of the operation data identification images, and a restriction lifting step for partially or completely lifting the restriction in accordance with contents of a play.

According to the present invention, on a guidance screen, operation data identification images each for identifying operation data item is displayed in accordance with a predetermined operation data sequence corresponding to a predetermined event. Display of the operation data identification images is restricted partially or completely, and this restriction is lifted in accordance with contents of the play. Such lifting of the restriction in accordance with the contents of the play may be performed by, for example, a player's operation of using an item given in accordance with the contents of the play, i.e. the player's performance. According to the present invention, because display restriction of the operation data identification image on the guidance screen is lifted in accordance with the contents of the play, the player can enjoy the process of acquiring information on a predetermined operation data sequence corresponding to a predetermined event.

According to one embodiment, the present invention further comprises object operation means for operating an object disposed in a virtual three-dimensional space in accordance with the operation data input with the controller, and the event triggering means triggers an event that causes the object in the virtual three-dimensional space to perform the action corresponding to the predetermined operation data sequence in accordance with the result of judgment by the judgment means. The object may be a battle game character object in a battle game. The operation corresponding to the predetermined operation data sequence may be a special technique performed by the battle game character object. According to this embodiment, the present invention can be suitably applied to battle games and the like.

According to another embodiment of the present invention, the operation data identification images are displayed in a tree form by the operation guidance means at least for the data sequences having the same operation data arranged as the head among a plurality of the predetermined operation data sequences each corresponding to a corresponding one of a plurality of the predetermined events. The tree form display is a guidance display in which sequential operation data items from the first input (i.e. head) operation data of the plural predetermined operation data sequences are displayed as collectively as possible for those having the same data. This embodiment allows a player to systematically understand the plurality of operation data sequences from the display screen.

According to a further embodiment of the present invention, the restriction means restricts display of all or part of the operation data identification images, each identifying the operation data to be input, following a predetermined middle position of the predetermined operation data sequence, and the restriction lifting means lifts display restriction for all or part of the operation data identification images, each identifying the operation data to be input, following the predetermined middle position. Thus, display of the operation data identification images is allowed in steps from the front image, and a player can be informed of all the predetermined operation data sequences in steps.

In this embodiment, restricted position image display means for displaying a restricted position image different from the operation data identification image at a position on the guidance screen corresponding to the predetermined middle position of the predetermined operation data sequence may be further comprised, so that a player can be informed of the middle position related to display restriction of the operation data identification image.

According to a further embodiment, the present invention further comprises suggestion image display means for displaying a suggestion image different from the operation data identification image at a position for displaying the operation data identification image whose display on the guidance screen is restricted when display of the operation data identification image is restricted by the restriction means. This makes it possible to inform a player with the suggestion image that display of the operation data identification image is restricted.

According to a further embodiment of the present invention, the event triggering means restricts, in accordance with restriction by the restriction means, triggering of the predetermined event corresponding to the predetermined operation data sequence in accordance with the result of judgment by the judgment means. This makes it possible to trigger the predetermined event corresponding to the predetermined operation data sequence when all the operation data identification images corresponding to the predetermined operation data sequence can be displayed without restriction.

BEST MODE FOR CARRYING OUT THE INVENTION

An exemplary embodiment of the present invention will now be described in detail with reference to the accompanying drawings.

Figure 1:
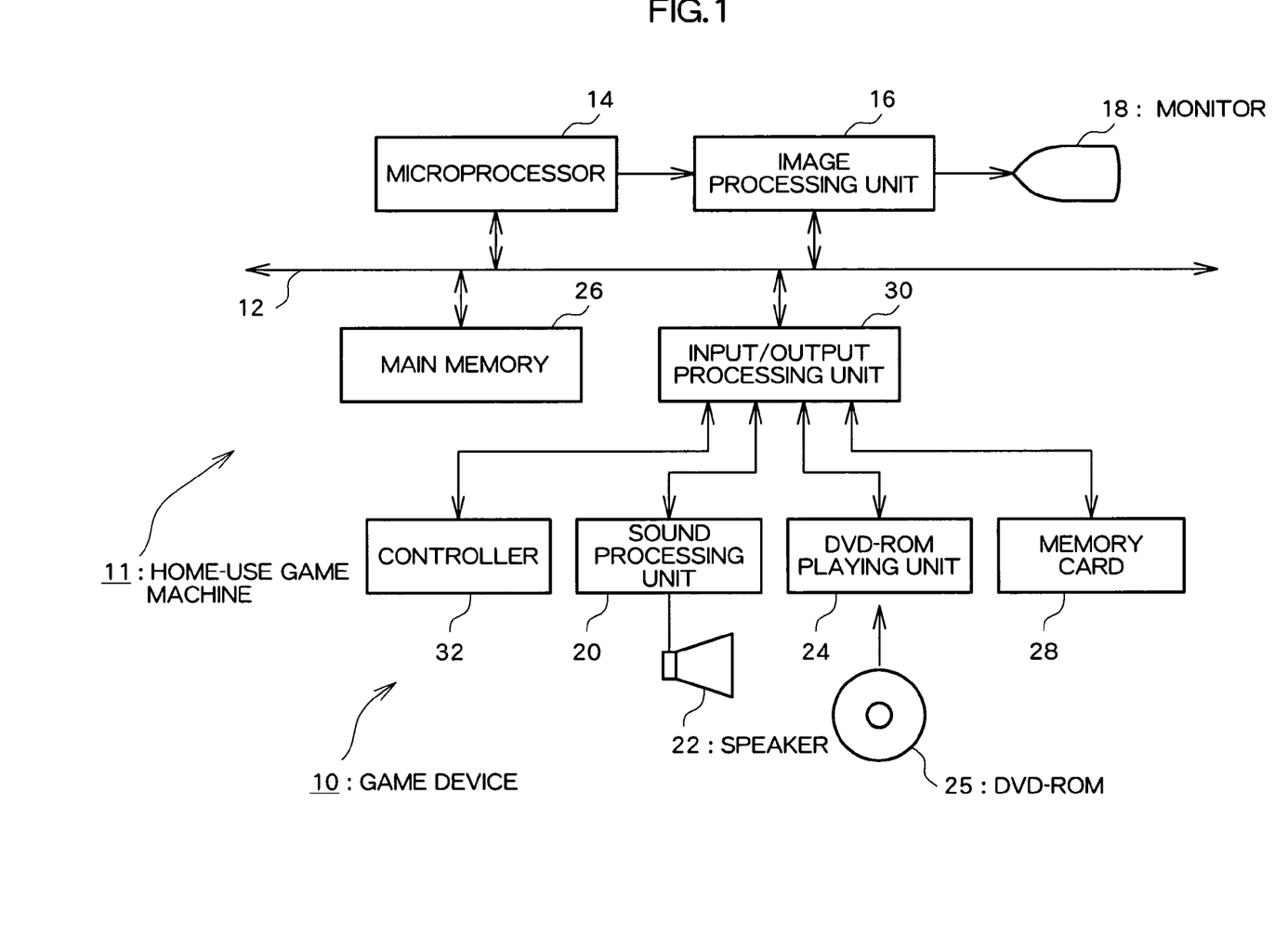
FIG. 1 is a flowchart showing a hardware configuration of a game device according to one embodiment of the present invention.

FIG. 1 illustrates a hardware configuration of a game device according to an embodiment of the present invention. As illustrated, the game device 10 is formed by a DVD-ROM 25, which is an information storage medium, and a memory card 28 placed in a home-use game machine 11 connected to a monitor 18 and a speaker 22. A home TV receiver is used as the monitor 18, and a speaker incorporated therein is used as the speaker 22. While the DVD-ROM 25 is used for supplying a program to the home-use game machine 11 in this embodiment, any other information storage media, such as CD-ROMs and ROM cards, may be used instead. The program can be remotely supplied to the home-use game machine 11 through a data network such as the Internet.

The home-use game machine 11 is a known computer game system including a microprocessor 14, an image processing unit 16, a main memory 26, and an input/output processing unit 30, a sound processing unit 20, a controller 32, and a DVD-ROM playing unit 24. The microprocessor 14, the image processing unit 16, the main memory 26, and the input/output processing unit 30 are mutually connected via a bus 12 for data exchange, with the input/output processing unit 30 being further connected to the controller 32, the sound processing unit 20, the DVD-ROM playing unit 24, and the memory card 28. The respective elements of the home-use game machine 11 are all accommodated in a housing excluding the controller 32.

The microprocessor 14 controls the respective elements of the home-use game machine 11 based on an operating system stored in an unillustrated ROM, the program read from the DVD-ROM 25, and the saved data read from the memory card 28, to provide a player with a game. The bus 12 is used for exchanging addresses and data among the respective elements of the home-use game machine 11. The main memory 26, which includes, for instance, a RAM, is used for storing the program read from the DVD-ROM 25 and the saved data read from the memory card 28 as required. The main memory 26 is also used for a work memory of the microprocessor 14. The image processing unit 16, which includes a VRAM, receives image data from the microprocessor 14, and draws a game screen image in the VRAM based on the data. The image processing unit 16, moreover, converts the content of the VRAM into a video signal provided to the monitor 18 at a predetermined timing.

The input/output processing unit 30 is an interface for allowing the microprocessor 14 to access the controller 32, the sound processing unit 20, the DVD-ROM playing unit 24 and the memory card 28. The sound processing unit 20 includes a sound buffer, and reproduces a variety of sound data, such as game music, game effect sound, and voice messages read by the DVD-ROM 25 and stored in the sound buffer, and outputs the data from the speaker 22. The DVD-ROM playing unit 24 reads the program recorded in the DVD-ROM 25 in accordance with an instruction from the microprocessor 14. The controller 32 is general-purpose operation input means used by a player to enter a variety of game operations. The memory card 28 includes a non-volatile memory (such as EEPROM), and is attachable/detachable to/from the home-use game machine 11. The memory card 28 stores saved data for various games and the like.

Figure 2:
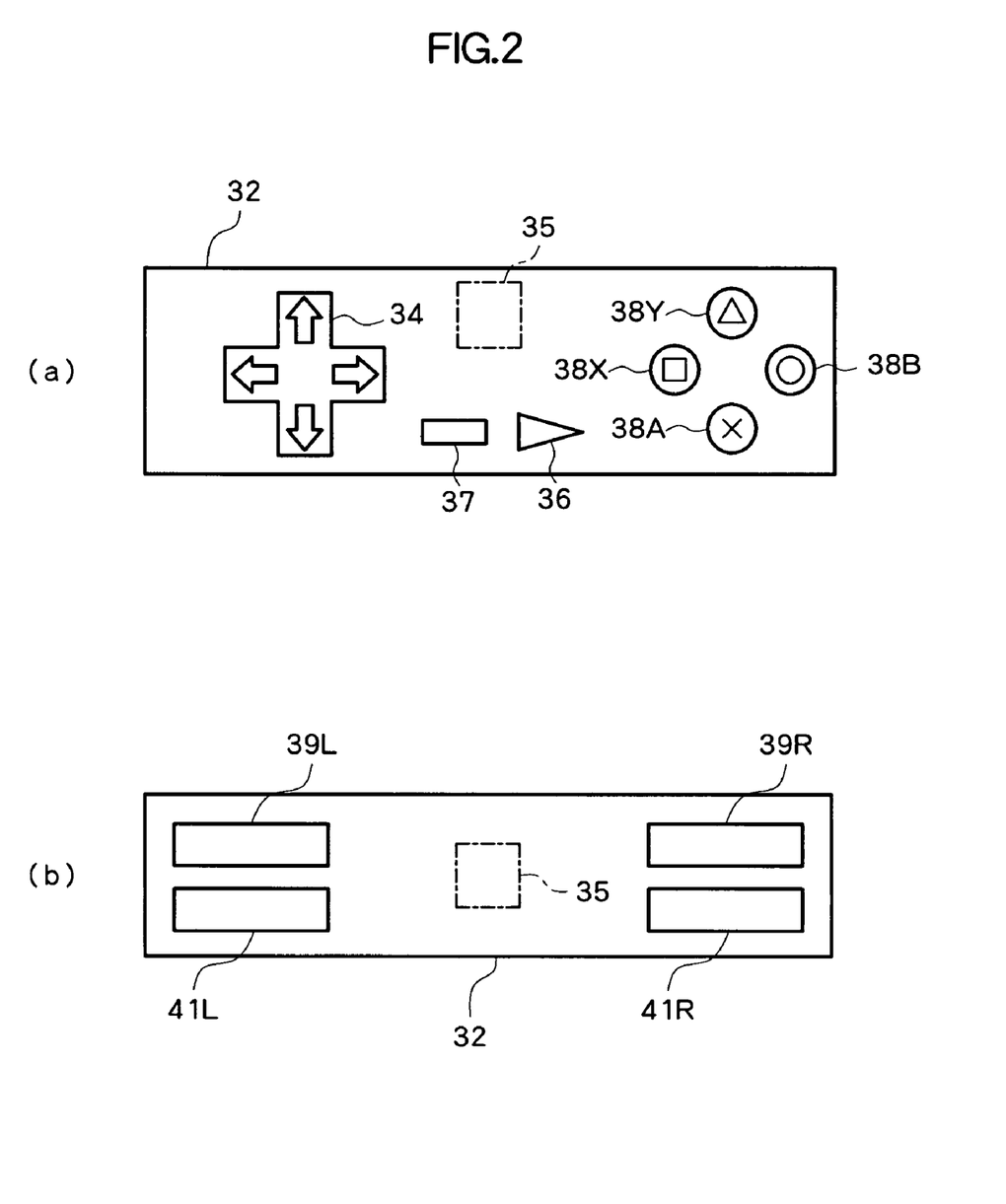
FIG. 2 is a view illustrating an external appearance of a controller.

FIG. 2 shows an example of the controller 32. As shown in FIG. 2(a), the controller 32, which is a general-purpose game controller, includes a cross key 34, a start key 36, a select key 37, and buttons 38X, 38Y, 38A, and 38B. In addition, the controller includes buttons 39L, 39R, 41L and 41R on a back side surface thereof as illustrated in FIG. 2(b). More specifically, on the back side surface of the controller 32, the buttons 41R and 41L are provided on the right and left thereof near a top surface while the buttons 39R and 39L are on the right and left thereof near a bottom surface. The cross key 34 is a cross-shaped key generally used for setting a direction of movement of a character or a cursor. The start key is a small triangle push button generally used for starting or forcing termination of the game. The buttons 38X, 38Y, 38A, 38B, 39L, 39R, 41L, and 41R are used for other game operations. When a user operates the controller 32, operation data indicating the content of the operation is input to the home-use game machine 11. The buttons 38X, 38Y, 38A, and 38B are provided with symbols □, Δ, X, and ○ on their respective surfaces. These symbols correspond to those on a first operation screen described hereinafter.

The controller 32 includes a vibrator 35 provided therein. The vibrator 35 is formed by, for example, a piezoelectric element, a motor having an eccentric weight, or the like, and operates in accordance with a vibration ON instruction supplied to the controller 32 from the microprocessor 14 to cause vibration of the controller 32. The vibrator 35 stops operation in accordance with a vibration OFF instruction supplied to the controller 32 from the microprocessor 14 to stop vibration of the controller 32.

In the game device 10 according to the present embodiment, a game program for a battle game is stored in the DVD-ROM 25 to be supplied to the home-use game machine 11. In this battle game, a game character object operable by a player with the controller 32 (player game character object) is disposed in a virtual three-dimensional space constructed and managed on the main memory 26. The object is designed in such a manner that the player can move the object back and forth and from side to side in the virtual 3-D space with the cross key 34 of the controller 32, and especially so that the player can cause the object to perform a special technique in response to a predetermined operation data sequence input to the home-use game machine 11 by operating the buttons 38X, 38Y, and 41L in accordance with a predetermined procedure. If two operation data items are sequentially input more than a predetermined time apart, these operation data items are handled as those belonging to different operation data sequences. More specifically, the game machine 10 determines whether or not the operation data sequence input by the controller 32 matches a predetermined operation data sequence, and, in accordance with the determination result, triggers a special technique event as a predetermined event corresponding to the predetermined operation data sequence.

This battle game is designed to provide a "combo chip" in accordance with the content of the play during the game. The "combo chip" is an item used by the player to acquire a special technique (an item causing display of a special operation procedure corresponding to a special technique event, and thus necessary to trigger the special technique event in the game). When the player uses the combo chip on a guidance screen described hereinafter, an operation procedure for causing the object to perform a new special technique (special operation procedure) is displayed on the guidance screen. By operating the controller 32 as in the operation procedure and supplying the operation data sequence (special operation data sequence) corresponding to the operation procedure to the home-use game machine 11, the game event related to the new special technique (special technique event) can be triggered.

Figure 3:
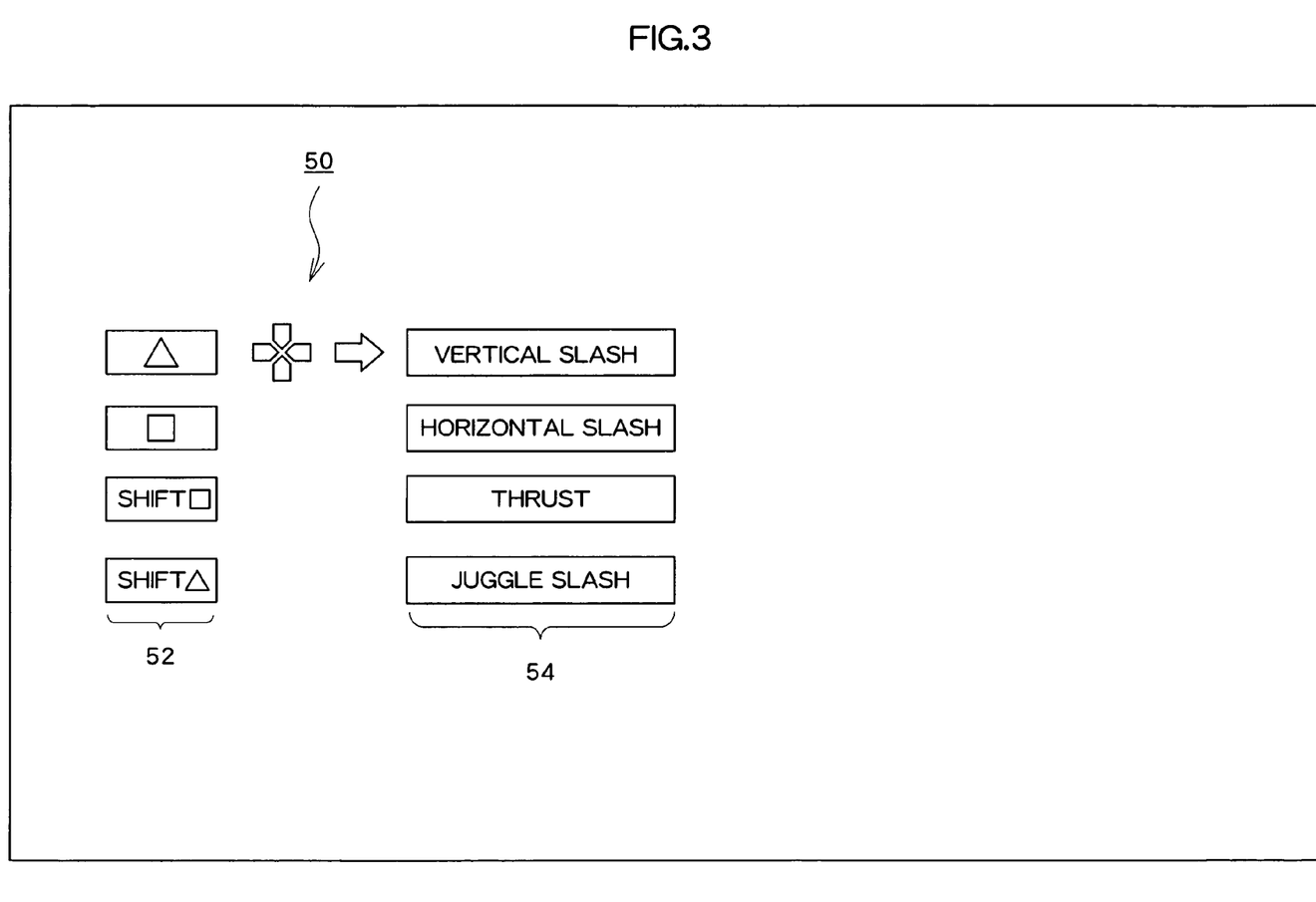
FIG. 3 is a view illustrating a combo table (guidance screen) selection screen.

FIG. 3 shows a combo table (guidance screen) selection screen displayed on the monitor 18. In this battle game, the combo table (guidance screen) can be displayed for each of four special technique categories, "vertical slash", "horizontal slash", "thrust", and "juggle slash". Each combo table systematically shows the operation procedures for causing the player game character object to perform a plurality of special techniques belonging to a certain category.

On the combo table selection screen shown in FIG. 3, pairs of first operation images 52 (operation data identification images) and combo table (guidance screen) names 54 are displayed in a plurality of rows. The first operation image 52 is an image for identifying operation data (i.e. operation content), and especially identifying operation data located at the head of the operation data sequence for triggering a special technique event. The combo table name 54 indicates a category of each combo table. According to FIG. 3, a group of special technique events belonging to the category "vertical slash", for example, are all triggered by operation data sequences having operation data corresponding to an operation of pressing the button 38Y as head operation data.

On the combo table selection screen, a cursor 50 is displayed between the first operation image 52 and the combo table name 54. The cursor 50 can be moved vertically with the cross key 34 of the controller 32. By operating the cross key 34 in the rightward direction while the cursor 50 is positioned in any of the rows, the combo table (guidance screen) related to the group of special technique events triggered by the operation data sequences having operation data identified by the first operation image 52 shown in that row as the head operation data is displayed.

Figure 4:
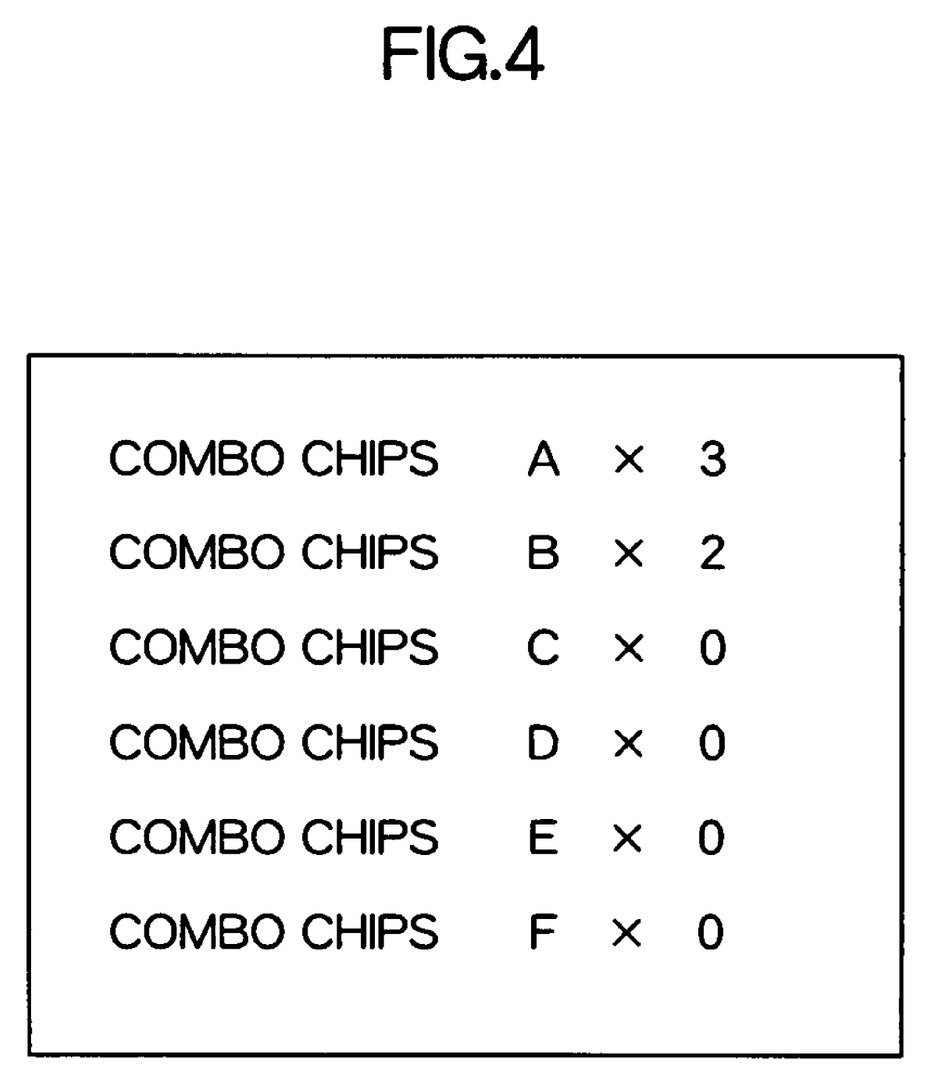
FIG. 4 is a view illustrating a list of combo chips currently possessed by the player.

FIG. 4 shows a list of combo chips possessed by the player. This list may be shown simultaneously with, for example, the combo table selection screen image of FIG. 3 or a combo table screen image of FIG. 5 described hereinafter. This game provides six kinds of combo chips in total, and the list shows for each kind the number of combo chips the player has already acquired but not yet used to cause display of the special operation procedure on the combo table screen. In the game device 10, the remaining number of each combo chip is stored in the main memory 26. The remaining number is increased by one when it is determined that the player should be given a combo chip in accordance with the content of the play, or decreased when the player uses the combo chip on the below-described combo table screen image.

Figure 5:
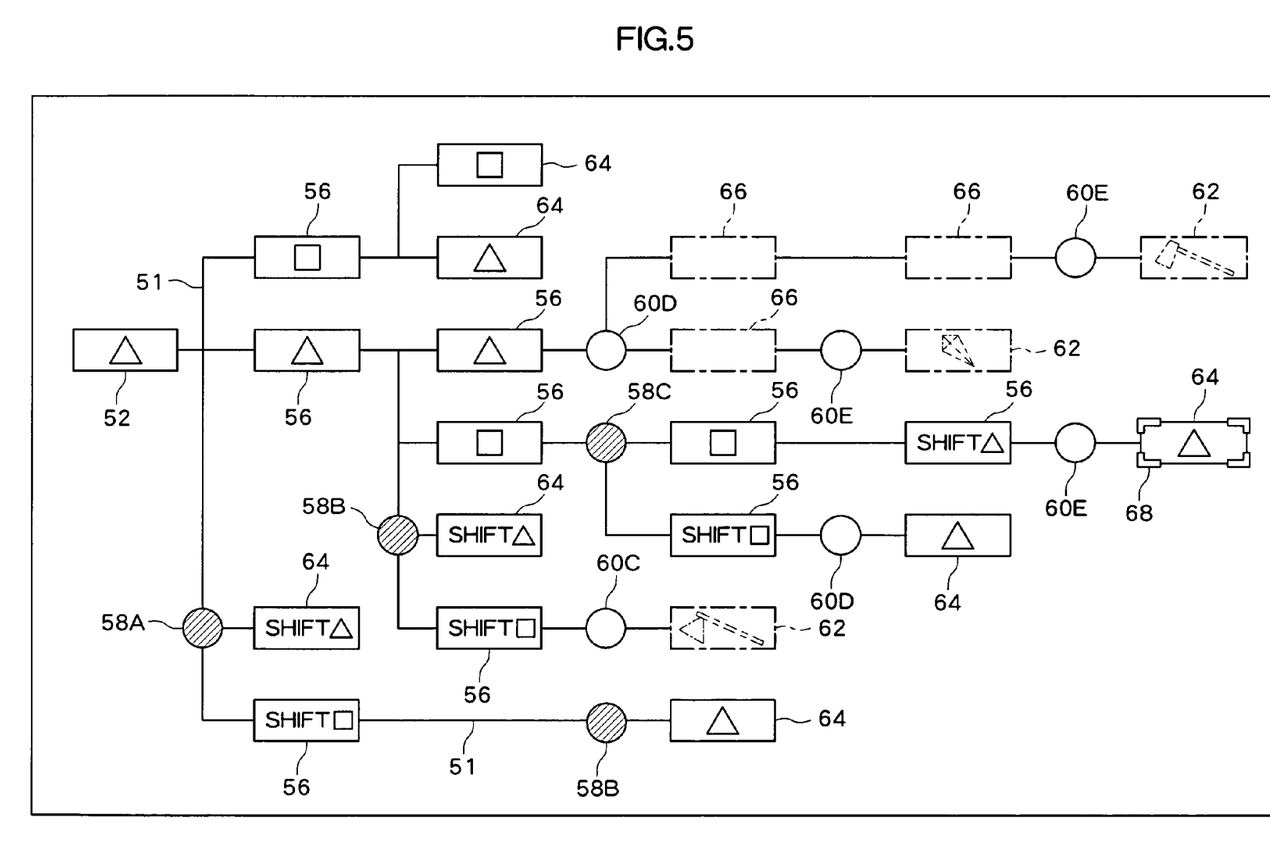
FIG. 5 is a view illustrating a combo table screen.

FIG. 5 shows a combo table screen. As an example of the combo table screen, the figure shows a combo table related to a group of special technique events corresponding to the operation data sequences having the operation data corresponding to the button 38Y as the head operation data. More specifically, the figure shows the combo table related to a plurality of (eight) special technique events corresponding to the operation data sequences starting with the operation data corresponding to the button 38Y. The table starts with the first operation image 52 labeled with the symbol "Δ" corresponding to the operation of pressing the button 38Y, and an acquired intermediate operation image 56 (operation data identification image), and the like are linked thereto with a connector image 51. A group of images shown on the right side of the first operation image 52, which is disposed on the left end of the screen image, and mutually linked sideways with the connector image 51 represent the operation data sequences.

The acquired intermediate operation images 56 include an image corresponding to an operation of pressing the button 38Y, an image corresponding to an operation of pressing the button 38X, an image corresponding to an operation of pressing the button 38Y while pressing the button 41L, and an image corresponding to an operation of pressing the button 38X while pressing the button 41L, and labeled with symbols "Δ", "□", "SHIFT Δ", and "SHIFT □", respectively. The acquired intermediate operation image 56 is an image indicating an operation for which provision of information to the player is not restricted among the operations forming the special operation procedures related to a plurality of special technique events displayed on the combo table screen shown in FIG. 5 to the player.

The combo table also shows an unacquired intermediate operation image 66 (suggestion image) indicated by a frame with a dash-dotted line in the figure and having a blank space therein. The unacquired intermediate operation image 66 is an image indicating an operation for which provision of information to the player is restricted among the operations forming the special operation procedures related to a plurality of special technique events displayed on the combo table screen to the player. Therefore, while the acquired intermediate operation image 56 is provided with a symbol corresponding to an operation, such a symbol is not shown in the unacquired intermediate operation image 66.

The combo table also indicates an unacquired tail operation image 62 (suggestion image) indicated by a frame with a dash-dotted line in the figure and including a picture of a weapon therein. The unacquired tail operation image 62 is displayed at the position where an image (an acquired tail operation image 64 described hereinafter) indicating the last operation of the special operation sequence should be displayed, and includes therein a picture related to a special technique event corresponding to a group of images linked in a horizontal direction including that unacquired tail operation image 62.

The combo table also shows the acquired tail operation image 64 indicated by a frame with a solid line in the figure and alternately showing a picture of a weapon and a symbol representing operation content (only one is shown in the figure). The acquired tail operation image 64 is displayed as the last operation of the special operation sequence for triggering the special technique event that can now be triggered by the player, alternately showing a symbol indicating the operation and a picture representing the special technique event.

The connector image 51 connects the unacquired tail operation image 62, the acquired tail operation image 64, the unacquired intermediate operation image 66, the acquired intermediate operation image 56, and the first operation image 52, so that the special operation sequence (i.e. the special operation data sequence) can be specified by the images disposed on a path from the first operation image 52 to the unacquired tail operation image 62 or the acquired tail operation image 64. On the combo table screen, the connector image 51 extending from the first operation image 52 is sequentially branched, and displayed in a tree form eventually branching to the number of special technique events, i.e. ten.

At some spots on the connector image 51, a set middle position image 58 and an unset middle position image 60 (restricted position image) are displayed. Plural kinds of unset middle position images 60 are arranged. More specifically, six kinds of images are arranged, namely, an image represented by a blue circular ring (not shown), an image represented by a light blue circular ring (not shown), an unset middle position image 60C represented by a green circular ring, an unset middle position image 60D represented by a yellow circular ring, an unset middle position image 60E represented by a red circular ring, and an image represented by a white circular ring (not shown). Such unset middle position images 60 each indicate a middle position of the operation data sequence at which a combo chip should be applied. By applying the combo chip of the same kind at this middle position, the middle position can be changed from the unset position to the set position. The color of the unset middle position image 60 indicates the kind of combo chip applicable at the displayed position. When changed to the set state, the set middle position image 58 described below replaces the unset middle position image 60 and is displayed.

Plural kinds of set middle position images 58 are also arranged. More specifically, six kinds of images are arranged, namely, a set middle position image 58A represented by a blue circle, a set middle position image 58B represented by a light blue circle, a set middle position image 58C represented by a green circle, an image represented by a yellow circle (not shown), an image represented by a red circle (not shown), and an image represented by a white circle (not shown). The color of the set middle position image 58 indicates the kind of combo chip applicable at the displayed position.

The combo table screen also shows a cursor 68, which can be moved using the cross key 34 of the controller 32 to a position overlapping any of the unacquired tail operation image 62, the acquired tail operation image 64, the set middle position image 58, and the unset middle position image 60.

By moving the cursor 68 to the position overlapping the set middle position image 58 and pressing, for example, the button 38B, the combo chip applied at this middle position can be removed, setting back to the state before the chip is applied. With this action, the set middle position image 58 is replaced by the unset middle position image 60 having the same color. In addition, the acquired intermediate operation image 56 indicating the operation to be performed after that middle position is replaced by the unacquired intermediate operation image 66, and the acquired tail operation image 64 is replaced by the unacquired tail operation image 62. Removal of the combo chip increases the remaining number of the combo chips of that kind (color) by 1. This combo chip can be applied again to any unset middle position image 60 corresponding to the combo chip of that kind in a below-described manner.

By moving the cursor 68 to the position overlapping the unset middle position image 60, and pressing, for example, the button 38B, the combo chip can be applied to that middle position if one or more combo chip corresponding to the unset middle position image 60 of that kind (color) remains, thereby replacing the unset middle position image 60 with the set middle position image 58 at that position, and displayed as such.

When the cursor 68 is moved to the position overlapping the unacquired tail operation image 62 or the acquired tail operation image 64, various information on the special technique event corresponding to that image is displayed on the monitor 18. The information includes the name, description of effects, and preview of the special technique (motion picture showing how the game character object actually performs the action corresponding to the special technique event), in addition to an operation procedure guidance image showing a special operation sequence for triggering the special technique event.

Figure 6:
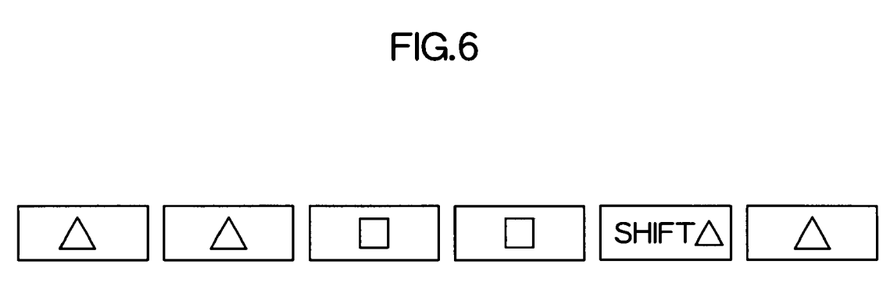
FIG. 6 is a view illustrating an operation procedure guidance image of an acquired special attack.
Figure 7:
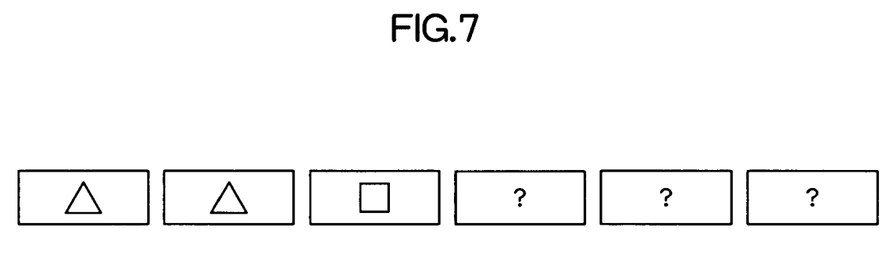
FIG. 7 is a view illustrating an operation procedure guidance image of a special attack yet to be acquired.

FIG. 6 and FIG. 7 show operation procedure guidance images. FIG. 6 shows the operation procedure guidance image displayed when the cursor 68 is moved to the position overlapping the acquired tail operation image 64. In this guidance image, images each indicating an operation forming the special operation procedure is arranged in the order of operation. On the other hand, FIG. 7 shows the operation procedure guidance image displayed when the cursor 68 is moved to the position overlapping the unacquired tail operation image 62. In this guidance image, among the middle positions which are prearranged on the path from the first operation image 52 to the unacquired tail operation image 62 of interest and to which the combo chip is not yet applied, a symbol "?" is displayed for the operation to be performed after the middle position located closest to the first operation image 52 (upstream), and for other operations an image indicating the particular operation is displayed.

According to the embodiment described above, a player acquires a combo chip in accordance with the content of the play in a battle game to increase a variable number indicating the remaining number of combo chips. By reducing (using) the variable number indicating the remaining number of combo chips, the combo chip can be applied to a middle position preset for each special operation sequence on a combo table screen, so that operations following that middle position can be displayed. When the combo chips are applied to all the preset middle positions, all the special operation sequences can be shown to the player. The player is allowed to use such special operation sequences, and to trigger the special technique event corresponding to the sequence. Thus, the player can fully enjoy the process of acquiring information on an input procedure of operation data corresponding to a special technique event.

The invention claimed is:

1. A game device including a controller allowing input of operation data, comprising:
    a processing unit which judges whether or not an operation data sequence input with the controller matches a predetermined operation data sequence and triggers a predetermined event corresponding to the predetermined operation data sequence in accordance with a result of judgment;
    a display unit which displays on a guidance screen, operation data identification images each identifying input operation data in accordance with the predetermined operation data sequence; and
    a memory unit which accumulates items which are acquired by a player according to a content of the player's play during a game,
    wherein the guidance screen includes a plurality of first positions for displaying the operation data identification images in accordance with the predetermined operation data sequence and a second position provided adjacent to at least one of the first position for applying one of the accumulated items,
    wherein the processing unit determines whether the player applies a first item among the accumulated items on the second position of the guidance screen, and controls the display unit to display an operation data identification image among the operation data identification images on one of the first positions adjacent to the second position based on the result of the determination.

2. A game device according to claim 1, wherein the processing unit operates an object disposed in a virtual three-dimensional space in accordance with the operation data input with the controller,
    and triggers, as the predetermined event, an event that causes the object in the virtual three-dimensional space to perform an action corresponding to the predetermined operation data sequence in accordance with the result of judgment by the processing unit.

3. A game device according to claim 1 or 2, wherein
    the operation data identification images are displayed in a tree form by the display unit at least for the data sequences having the same operation data arranged as a head among a plurality of the predetermined operation data sequences each corresponding to a corresponding one of a plurality of the predetermined events.

4. A game device according to claim 1, wherein
    all or part of the operation data identification images each identifying the operation data to be input following the second position of the predetermined operation data sequence are restricted from being displayed, and
    all or part of the operation data identification images each identifying the operation data to be input following the second position are displayed based on the determination.

5. The game device according to claim 1, wherein the items are categorized into different groups based on a type of the items.

6. A game device according to claim 4,
    wherein a restricted position image different from the operation data identification image is displayed at a position on the guidance screen corresponding to the predetermined middle position of the predetermined operation data sequence.

7. A game device according to claim 1, wherein a suggestion image different from the operation data identification image is displayed at a position for displaying the operation data identification image when display of the operation data identification image is restricted.

8. A non-transitory information storage medium readable by a computer and storing a program executed by a computer connected to a controller allowing input of operation data and causing the computer to perform a method comprising:
    accumulating items which are acquired by a player according to a content of the player's play during a game;
    displaying on a guidance screen, operation data identification images each identifying input operation data in accordance with a predetermined operation data sequence, the guidance screen including a plurality of first positions for displaying the operation data identification images in accordance with the predetermined operation data sequence and a second position provided adjacent to at least one of the first position for applying one of the accumulated items;
    determining whether the player applies a first item among the accumulated items on the second position of the guidance screen;
    displaying an operation data identification image among the operation data identification images on one of the first portions adjacent to the second position based on the result of the determination;
    judging whether or not an operation data sequence input with the controller matches the predetermined operation data sequence; and
    triggering a predetermined event corresponding to the predetermined operation data sequence.

9. A method of controlling a game machine including a controller allowing input of operation data, comprising:
- accumulating items that are acquired by a player according to a content of the player's play during a game;
- displaying on a guidance screen, operation data identification images each identifying input operation data in accordance with a predetermined operation data sequence, the guidance screen including a plurality of first positions for displaying the operation data identification images in accordance with the predetermined operation data sequence and a second position provided adjacent to at least one of the first position for applying one of the accumulated items;
- determining, by a processor, whether the player applies a first item among the accumulated items on the second position of the guidance screen;
- displaying an operation data identification image among the operation data identification images on one of the first portions adjacent to the second position based on the result of the determination;
- judging whether or not an operation data sequence input with the controller matches the predetermined operation data sequence; and
- triggering a predetermined event corresponding to the predetermined operation data sequence in accordance with a result of judgment at the judgment step.

10. The game device according to claim 5, wherein the plurality of first positions are categorized into different groups corresponding to the grouped items.

11. The game device according to claim 10, wherein when the player moves a cursor to the second position and applies the first item that is the same type as the second position by pressing a button on the controller, the processing unit controls the display unit to display the operation data identification image among the operation data identification images on one of the first positions adjacent to the second position.

* * * * *